United States Patent
Liao et al.

(10) Patent No.: US 9,298,470 B2
(45) Date of Patent: Mar. 29, 2016

(54) METHOD AND APPARATUS FOR SELECTING BIOS PROGRAM FOR A PROCESSOR

(71) Applicant: Huawei Technologies Co., Ltd., Shenzhen (CN)

(72) Inventors: Yixiang Liao, Hangzhou (CN); Dengben Wu, Hangzhou (CN); Yu Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 560 days.

(21) Appl. No.: 13/624,415

(22) Filed: Sep. 21, 2012

(65) Prior Publication Data

US 2013/0080752 A1    Mar. 28, 2013

Related U.S. Application Data

(63) Continuation of application No. PCT/CN2011/080007, filed on Sep. 22, 2011.

(51) Int. Cl.
G06F 9/44    (2006.01)

(52) U.S. Cl.
CPC .................... *G06F 9/4403* (2013.01)

(58) Field of Classification Search
CPC .............................. G06F 9/4403; G06F 15/177
USPC ........................................................ 713/1, 2
See application file for complete search history.

(56) References Cited

U.S. PATENT DOCUMENTS

| 6,161,177 | A  | * | 12/2000 | Anderson | 713/2 |
| 6,748,526 | B1 | * | 6/2004 | Thangadurai | 713/1 |
| 6,981,135 | B1 | * | 12/2005 | Trask | 713/1 |
| 8,462,961 | B1 | * | 6/2013 | Bywaters et al. | 381/77 |
| 2003/0065893 | A1 | * | 4/2003 | Lary et al. | 711/147 |
| 2003/0135350 | A1 |   | 7/2003 | Cheston et al. | |

(Continued)

FOREIGN PATENT DOCUMENTS

| CN | 1670696 A | 9/2005 |
| CN | 1779643 A | 5/2006 |

(Continued)

OTHER PUBLICATIONS

International Search Report and Written Opinion of the International Searching Authority issued in corresponding PCT Patent Application No. PCT/CN2011/080007, mailed Jun. 21, 2012.

(Continued)

*Primary Examiner* — Thomas Lee
*Assistant Examiner* — Danny Chan
(74) *Attorney, Agent, or Firm* — Brinks Gilson & Lione

(57) ABSTRACT

A method and an apparatus for implementing compatibility of different processors are provided. The method includes: in a standby state of a board, obtaining configuration information and a type of a processor on the board; and if a processor type in the configuration information is different from the type of the processor, updating, according to the processor, a parameter that is relevant to the processor and is in the configuration information, and changing FLASH memory chip selection configuration in order to connect the connector to a FLASH memory for storing a BIOS program of the processor.

12 Claims, 3 Drawing Sheets

(56) References Cited

U.S. PATENT DOCUMENTS

| | | | |
|---|---|---|---|
| 2003/0233536 A1* | 12/2003 | Chheda et al. | 713/1 |
| 2006/0129795 A1* | 6/2006 | Bulusu et al. | 713/2 |
| 2006/0149954 A1* | 7/2006 | Hageman et al. | 713/1 |
| 2007/0033390 A1* | 2/2007 | Chang et al. | 713/2 |
| 2008/0288764 A1* | 11/2008 | Lu | 713/2 |
| 2009/0158025 A1* | 6/2009 | Hung et al. | 713/2 |
| 2010/0037042 A1* | 2/2010 | Kuo | 713/2 |
| 2012/0110379 A1* | 5/2012 | Shao et al. | 714/15 |

FOREIGN PATENT DOCUMENTS

| | | |
|---|---|---|
| CN | 101354659 A | 1/2009 |
| CN | 101609406 A | 12/2009 |

OTHER PUBLICATIONS

Search Report issued corresponding Chinese Patent Application No. 2011800018955, mailed Sep. 26, 2012.

* cited by examiner

METHOD AND APPARATUS FOR SELECTING BIOS PROGRAM FOR A PROCESSOR

CROSS-REFERENCE TO RELATED APPLICATIONS

This application is a continuation of International Application No. PCT/CN2011/080007, filed on Sep. 22, 2011, which is hereby incorporated by reference in its entirety.

FIELD OF THE DISCLOSURE

The present invention relates to the field of computer technologies, and in particular, to a method and an apparatus for implementing compatibility of different processors.

BACKGROUND

In a current market, processors of different brands exist. In an aspect of hardware, if pin to pin (Pin to Pin) compatibility is implemented between different processors, board multiplexing may be conveniently achieved. That is, on a board, a performance upgrade may be implemented only by replacing a CPU. However, because different processors differ in aspects such as memory control, QPI (Quick Path Interconnect, quick path interconnect) implementation, and CPU architecture, it is not easy for a BIOS (Basic Input/Output System, basic input/output system) to implement compatibility between different processors at a code level.

Therefore, in the prior art, the following two methods are generally adopted to implement the compatibility between different processors.

1. A BIOS program is saved in a FLASH device of a board, and in a power-on process of the board, a CPU maps codes in a FLASH memory to a memory space by default, and starts the BIOS program from a certain address. In a startup process, the BIOS performs different branch processing according to different types and architecture of CPUs. That is to say, a set of codes is processed differently inside the BIOS according to different CPUs.

This manner not only involves a large quantity of codes, but also has a complex processing logic among the codes, so maintenance and expansibility are difficult.

2. According to different CPUs, different BIOS programs are written into a FLASH memory of a board to implement compatibility of the different CPUs.

In this manner, firstly, a user needs to know how to write a BIOS. Next, the user also needs to know which CPU uses which version of the BIOS. Once an error occurs in the writing, it is caused that the whole board may not be started normally.

As may be seen, the implementation of the two methods for implementing the compatibility of different processors is complex and is not easy to operate.

SUMMARY

For the foregoing problems existing in the prior art, embodiments of the present invention provide a method and an apparatus for implementing compatibility of different processors, to easily and conveniently implement that a single hardware platform supports multiple different processors.

In order to solve the foregoing technical problems, the embodiments of the present invention adopt the following technical solutions.

A method for implementing compatibility of different processors is provided, which includes:

in a standby state of a board, separately obtaining system configuration information and a type of a processor on the board, where at least two FLASH memories that separately store BIOS programs corresponding to different processors are set on the board; and if a processor type in the system configuration information is different from the type of the processor, updating, according to the type of the processor, a parameter that is relevant to the processor and is in the system configuration information, and changing FLASH memory chip selection configuration, so as to connect the processor to a FLASH memory storing a BIOS program of the processor.

An apparatus for implementing compatibility of different processors is provided, which includes: a processor, at least two FLASH memories that separately store BIOS programs corresponding to different processors, and a baseboard management controller which are set on one board, where the baseboard management controller is configured to, in a standby state of the board, separately obtain system configuration information and a type of the processor, and when a processor type in the system configuration information is different from the type of the processor, update, according to the type of the processor, a parameter that is relevant to the processor and is in the system configuration information, and change FLASH memory chip selection configuration, so as to connect the processor to a FLASH memory storing a BIOS program of the processor.

In the method and apparatus for implementing compatibility of different processors provided by the embodiments of the present invention, at least two FLASH memories that separately store BIOS programs corresponding to different processors are set on the board. In the standby state of the board, the system configuration information and the type of the processor on the board are obtained, so that chip selection of a FLASH memory may be automatically controlled according to the type of the processor. When the processor type in the system configuration information is different from the type of the processor, the parameter that is relevant to the processor and is in the system configuration information is updated according to the type of the processor, and the FLASH memory chip selection configuration is changed, so as to connect the processor to the FLASH memory storing the BIOS program of the processor. In this way, not only design of the BIOS program is simplified, but also a user does not need to manually write the BIOS program. That is, a single hardware platform may support multiple different processors, which facilitates the updating and maintenance of the BIOS program and makes it convenient for the user to use.

BRIEF DESCRIPTION OF THE DRAWINGS

To illustrate technical solutions according to the embodiments of the present invention or in the prior art more clearly, accompanying drawings required for describing the embodiments or the prior art are introduced below briefly. Apparently, the accompanying drawings in the following descriptions are only some of the embodiments of the present invention, and persons of ordinary skill in the art may obtain other drawings according to these accompanying drawings without making creative efforts.

DETAILED DESCRIPTION OF THE EMBODIMENTS

In order to make persons skilled in the art understand solutions in embodiments of the present invention better, the embodiments of the present invention are further illustrated in detail below with reference to accompanying drawings and implementations.

In a method and an apparatus for implementing compatibility of different processors provided by the embodiments of the present invention, at least two FLASH memories that separately store BIOS programs corresponding to different processors are set on a board. In a standby state of the board, system configuration information and a type of a processor on the board are obtained, so that chip selection of a FLASH memory may be automatically controlled according to the type of the processor. When a processor type in the system configuration information is different from the type of the processor, a parameter that is relevant to the processor and is in the system configuration information is updated according to the type of the processor, and FLASH memory chip selection configuration is changed, so as to connect the processor to a FLASH memory storing a BIOS program of the processor.

Figure 1:
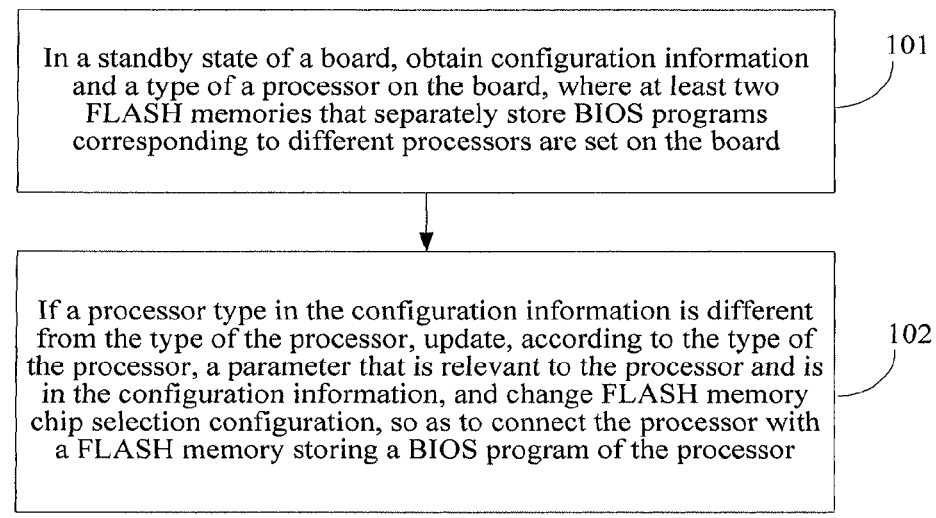
FIG. 1 is a flow chart of a method embodiment for implementing compatibility of different processors according to the present invention.

As shown in FIG. 1, it is a flow chart of a method embodiment for implementing compatibility of different processors according to the present invention. The method includes the following steps.

Step 101: In a standby state of a board, obtain system configuration information and a type of a processor on the board, where at least two FLASH memories that separately store BIOS (Basic Input/Output System, basic input/output system) programs corresponding to different processors are set on the board.

Specifically, a BMC (Baseboard Management Controller, baseboard management controller) may be used to read a configuration file to obtain the system configuration information, where the system configuration information includes processor type information. In addition, the baseboard management controller may also read a PIROM (Processor Information Read-Only Memory, processor information read-only memory) of the processor on the board through an SMBus (System Management Bus, system management bus), to obtain the type of the processor.

Step 102: If a processor type in the system configuration information is different from the type of the processor, update, according to the type of the processor, a parameter that is relevant to the processor and is in the system configuration information, and change FLASH memory chip selection configuration, so as to connect the processor to a FLASH memory storing a BIOS program of the processor.

Multiple FLASH memories corresponding to different processors are set on the board in the embodiment of the present invention, to store BIOS programs of the corresponding processors. Therefore, it is required that a processor type in system configuration information and a started BIOS program to correspond to a type of a processor actually installed on the board. Otherwise, the processor may not run normally.

Therefore, the baseboard management controller may be used to compare the processor type in the system configuration information and the obtained type of the processor actually installed on the board. When the two are different, not only the parameter relevant to the processor, for example, processor type information, needs to be changed to ensure the accuracy of the system configuration information, but also the FLASH memory chip selection configuration needs to be changed, in order to connect the processor to the FLASH memory storing the BIOS program of the processor, and to ensure that after the board is powered up, a correct BIOS program is started to make the processor run normally.

In specific application, the FLASH memory chip selection configuration may be changed by directly changing strap configuration of the processor, or the FLASH memory chip selection configuration may be changed by performing a read/write operation on a register of a programmable logic device. Definitely, other manners may also be adopted to change the FLASH memory chip selection configuration, and are not limited by the embodiment of the present invention.

By using the method for implementing compatibility of different processors according to the embodiment of the present invention, pin to pin compatibility of multiple different processors may be implemented, which not only simplifies design of the BIOS program, but also does not require a user to manually write the BIOS program. That is, a single hardware platform may support multiple different processors which facilitates the updating and maintenance of the BIOS program and makes it convenient for the user to use.

The method for implementing compatibility of different processors according to the embodiment of the present invention may be applicable to various different boards and processors, and all or part of the steps in the method of the embodiment may be implemented with the help of software plus a necessary universal hardware platform. For example, the foregoing procedure is implemented by the baseboard management controller.

Figure 2:
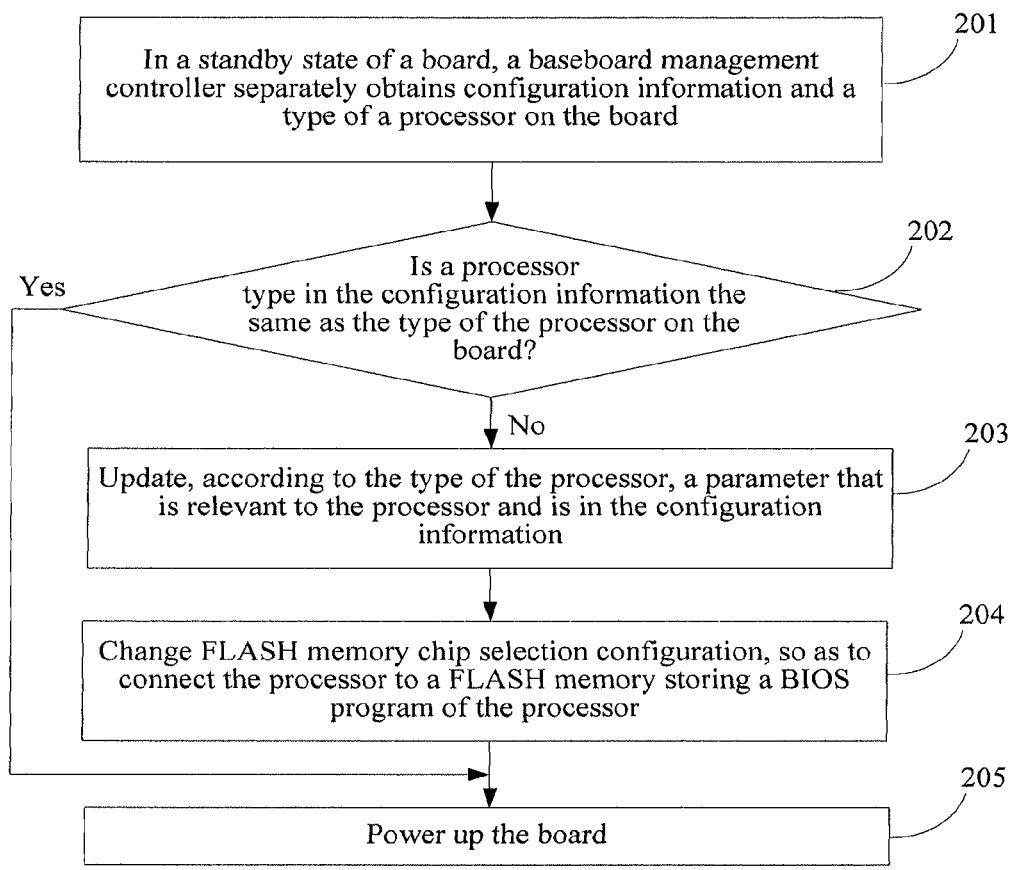
FIG. 2 is a flow chart of a power-on process of a board applying a method for implementing compatibility of different processors according to an embodiment of the present invention.

As shown in FIG. 2, it is a flow chart of a power-on process of a board applying a method for implementing compatibility of different processors according to an embodiment of the present invention.

Step 201: In a standby state of a board, a baseboard management controller separately obtains system configuration information and a type of a processor on the board.

Step 202: Determine whether a processor type in the system configuration information is the same as the type of the processor on the board; and if yes, perform step 205; otherwise, perform step 203.

Step 203: Update, according to the type of the processor, a parameter that is relevant to the processor and is in the system configuration information.

Step 204: Change FLASH memory chip selection configuration, so as to connect the processor to a FLASH memory for storing a BIOS program of the processor.

Step 205: Power up the board.

As may be seen, by using the method for implementing compatibility of different processors according to the embodiment of the present invention, no matter which type of processor is used by a user, as long as a FLASH memory storing a BIOS program of the processor is set on the board, normal startup of the processor on the board may be automatically ensured, thereby implementing pin to pin compatibility of multiple different processors, making it convenient for the user to operate and use.

Correspondingly, an embodiment of the present invention further provides an apparatus for implementing compatibility of different processors. The apparatus includes: a processor, at least two FLASH memories that separately store BIOS programs corresponding to different processors, and a baseboard management controller which are set on one board. The baseboard management controller is configured to, in a standby state of the board, separately obtain system configuration information and a type of the processor, and when a processor type in the system configuration information is different from the type of the processor, update, according to the type of the processor, a parameter that is relevant to the processor and is in the system configuration information, and change FLASH memory chip selection configuration, so as to connect the processor to a FLASH memory for storing a BIOS program of the processor.

In actual application, there may be multiple different connection manners for the baseboard management controller, the FLASH memories and the processor, so that the baseboard management controller may control chip selection of a FLASH memory in different manners, which is illustrated in detail with an example in the following.

In the following embodiment, it is taken as an example for illustration that two FLASH memories are set on the board. However, in the apparatus for implementing compatibility of different processors according to the embodiment of the present invention, FLASH memories that that are on the board and store BIOS programs corresponding to different processors are not limited to this. According to requirements, there may be more than two.

Figure 3:
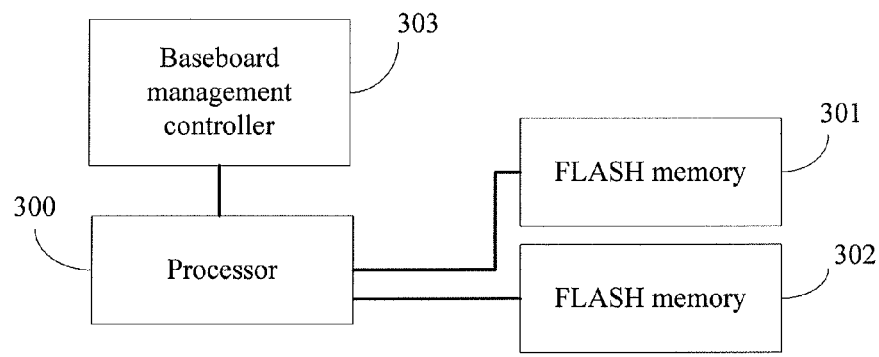
FIG. 3 is a schematic structural diagram of a first embodiment of an apparatus for implementing compatibility of different processors according to the present invention.

As shown in FIG. 3, it is a schematic structural diagram of a first embodiment of an apparatus for implementing compatibility of different processors according to the present invention.

In this embodiment, the apparatus includes: a processor 300, FLASH memories 301 and 302, and a baseboard management controller 303 which are set on a same board. The processor 300 is connected to each FLASH memory separately through a different pin. The baseboard management controller 303 is connected to the processor 300 through a system management bus.

In a standby mode of the board, the baseboard management controller 303 separately obtains system configuration information and a type of the processor 300, and when a processor type in the system configuration information is different from the type of the processor 300, updates, according to the type of the processor 300, a parameter that is relevant to the processor 300 and is in the system configuration information, and changes FLASH memory chip selection configuration, so as to connect the processor 300 to a FLASH memory for storing a BIOS program of the processor.

In this embodiment, the baseboard management controller 303 may be directly connected to a strap pin (strap pin) of the processor 300. The FLASH memory chip selection configuration is changed by changing strap configuration of the processor 300, so as to connect the processor 300 to the FLASH memory for storing the BIOS program of the processor, for example, the FLASH memory 301.

Figure 4:
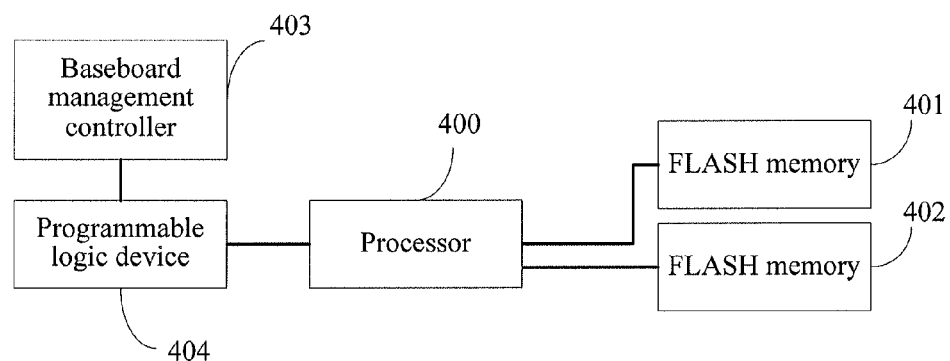
FIG. 4 is a schematic structural diagram of a second embodiment of an apparatus for implementing compatibility of different processors according to the present invention.

As shown in FIG. 4, it is a schematic structural diagram of a second embodiment of an apparatus for implementing compatibility of different processors according to the present invention.

In this embodiment, the apparatus includes: a processor 400, FLASH memories 401 and 402, a baseboard management controller 403, and a programmable logic device 404 which are set on a same board. The processor 400 is connected to each FLASH memory separately through a different pin. The programmable logic device 404 is connected to the baseboard management controller 403 and the processor 400 separately.

In a standby mode of the board, the baseboard management controller 403 separately obtains system configuration information and a type of the processor 400, and when a processor type in the system configuration information is different from the type of the processor 400, updates, according to the type of the processor 400, a parameter that is relevant to the processor 400 and is in the system configuration information, and changes FLASH memory chip selection configuration, so as to connect the processor 400 to a FLASH memory for storing a BIOS program of the processor.

In this embodiment, the baseboard management controller 403 may change the FLASH memory chip selection configuration by performing a read/write operation on a register of the programmable logic device 404, so as to connect the processor 400 to the FLASH memory for storing the BIOS program of the processor, for example, the FLASH memory 401.

Figure 5:
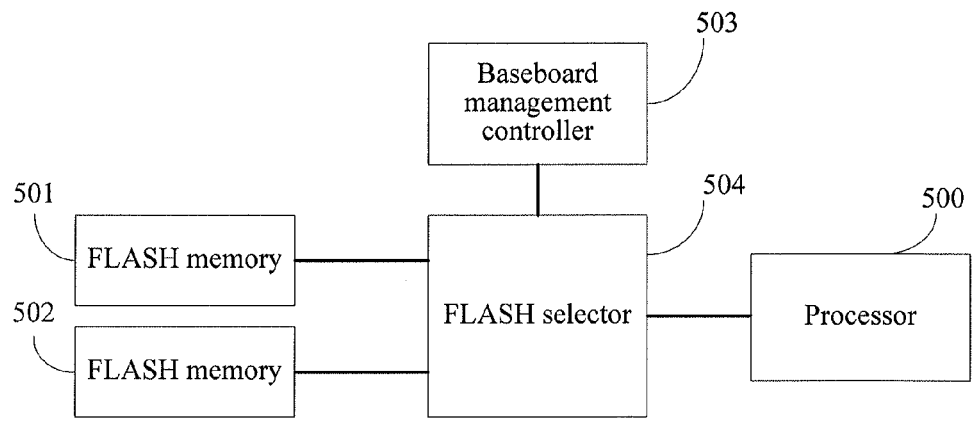
FIG. 5 is a schematic structural diagram of a third embodiment of an apparatus for implementing compatibility of different processors according to the present invention.

As shown in FIG. 5, it is a schematic structural diagram of a third embodiment of an apparatus for implementing compatibility of different processors according to the present invention.

In this embodiment, the apparatus includes: a processor 500, FLASH memories 501 and 502, a baseboard management controller 503, and a FLASH selector 504 which are set on a same board. The processor 500 is connected to each FLASH memory separately through a different pin. The FLASH selector 504 is connected to the baseboard management controller 503, the processor 500, and each FLASH memory separately.

In a standby mode of the board, the baseboard management controller 503 separately obtains system configuration information and a type of the processor 500, and when a processor type in the system configuration information is different from the type of the processor 500, updates, according to the type of the processor 500, a parameter that is relevant to the processor 500 and is in the system configuration information, and changes FLASH memory chip selection configuration, so as to connect the processor 500 to a FLASH memory storing a BIOS program of the processor.

In this embodiment, the baseboard management controller 503 changes the FLASH memory chip selection configuration by controlling the FLASH selector 504, so as to connect the processor 500 to the FLASH memory for storing the BIOS program of the processor, for example, the FLASH memory 501.

The FLASH selector may be specifically implemented through some programmable logic devices (for example, a CPLD and an FPGA).

Figure 6:
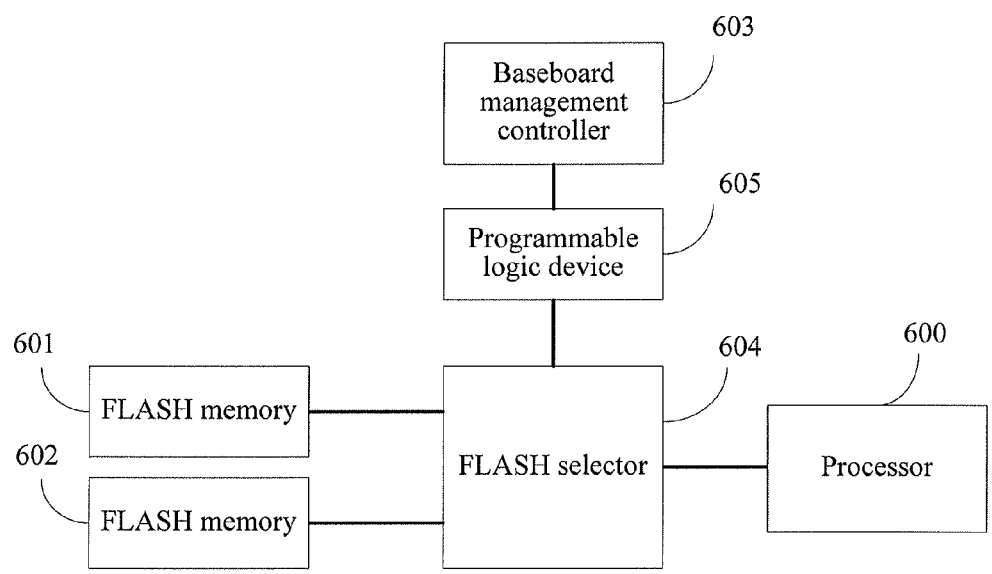
FIG. 6 is a schematic structural diagram of a fourth embodiment of an apparatus for implementing compatibility of different processors according to the present invention.

As shown in FIG. 6, it is a schematic structural diagram of a fourth embodiment of an apparatus for implementing compatibility of different processors according to the present invention.

In this embodiment, the apparatus includes: a processor 600, FLASH memories 601 and 602, a baseboard management controller 603, a FLASH selector 604, and a programmable logic device 605 which are set on a same board. The programmable logic device 605 is connected to the baseboard management controller 603. The FLASH selector 604 is separately connected to the programmable logic device 605, the processor 600 and each FLASH memory.

In a standby mode of the board, the baseboard management controller 603 separately obtains system configuration information and a type of the processor 600, and when a processor type in the system configuration information is different from the type of the processor 600, updates, according to the type of the processor 600, a parameter that is relevant to the processor 600 and is in the system configuration information, and changes FLASH memory chip selection configuration, so as to connect the processor 600 to a FLASH memory storing a BIOS program of the processor.

In this embodiment, the baseboard management controller 603 controls the FLASH selector 604 by performing a read/write operation on a register of the programmable logic device 605. The FLASH selector 604 changes the FLASH memory chip selection configuration according to the control of the baseboard management controller 603, so as to connect the processor 600 to the FLASH memory storing the BIOS program of the processor, for example, the FLASH memory 601.

In comparison with the embodiments shown in FIG. 3 and FIG. 4, in the embodiments shown in FIG. 5 and FIG. 6, FLASH chip selection performed by the baseboard management controller is an operation completed before the processor is powered up. Therefore, for the processor, the operation may not be sensed. That is to say, the FLASH selection is transparent to the processor. In addition, the apparatuses of the embodiments shown in FIG. 5 and FIG. 6 may be used without being limited by a CPU pin, and may be conveniently expanded to select from more FLASH memories, having greater expansibility and flexibility.

It should be noted that, the baseboard management controller in the foregoing embodiments may further be configured to power up the board after changing the FLASH memory chip selection configuration, and power up the board when the processor type in the system configuration information is the same as the type of the processor.

Definitely, the apparatus for implementing compatibility of different processors according to the embodiments of the present invention is not limited to the structures in the foregoing embodiments. In actual application, there may be other structural variations, which are not limited by the embodiments of the present invention.

As may be seen, by using the apparatus for implementing compatibility of different processors according to the embodiments of the present invention, no matter which type of processor is used by a user, as long as a FLASH memory storing a BIOS program of the processor is set on the board, normal startup of the processor on the board may be automatically ensured, thereby implementing pin to pin compatibility of multiple different processors, and making it convenient for the user to operate and use.

It should be noted that, each embodiment in the specification is described in a progressive manner. The same or similar parts in the embodiments are just references to each other. Every embodiment illustrates in emphasis what is different from the other embodiments. In particular, for the apparatus embodiment, because it is basically similar to the method embodiment, the description is relatively simple, and for the relevant part, reference is just made to the part of the description of the method embodiment. The apparatus embodiment described above is merely exemplary, in which units described as separate components may be or may not be physically separated, and components shown as units may be or may not be physical units. Part of or all of the modules may be selected to achieve the objective of the solution of this embodiment according to actual requirements. Persons of ordinary skill in the art may have understanding and make implementation without making creative efforts.

What are described above are only exemplary embodiments of the present invention, but are not intended to limit the protection scope of the present invention. Any modification, equivalent replacement, and improvement made within the spirit and principle of the present invention all fall within the protection scope of the present invention.

What is claimed is:

1. A method for selecting a BIOS program for a processor, performing when a board is in a standby state, comprising:
   separately obtaining system configuration information and a type of a processor on the board, utilizing at least two FLASH memories for separately storing BIOS programs corresponding to different processors set on the board; and
   comparing, by a baseboard management controller, if a processor type in the system configuration information is different from the type of the processor, updating according to the type of the processor, a parameter that is relevant to the processor in the system configuration information, and changing FLASH memory chip selection configuration in order to connect the processor to a FLASH memory for storing a BIOS program of the processor.

2. The method according to claim 1, wherein the obtaining of the system configuration information comprising: obtaining the system configuration information through a system configuration file.

3. The method according to claim 1, wherein the obtaining the type of the processor on the board comprising:
   obtaining the type of the processor by reading a Processor Information Read-Only Memory (PIROM) of the processor on the board through a system management bus.

4. The method according to claim 1, wherein the changing the FLASH memory chip selection configuration comprising:
   changing the FLASH memory chip selection configuration by directly changing strap configuration of the processor; or
   changing the FLASH memory chip selection configuration by performing a read/write operation on a register of a programmable logic device.

5. The method according to claim 1, further comprising:
   powering up the board after changing the FLASH memory chip selection configuration; and
   powering up the board if the processor type in the system configuration information is the same as the type of the processor.

6. The method according to claim 1, wherein the changing the FLASH memory chip selection configuration comprises:
   changing the FLASH memory chip selection configuration by controlling the FLASH selector.

7. An apparatus for selecting a BIOS program for a processor, comprises: a processor, at least two FLASH memories which separately stores BIOS programs corresponding to different processors, and a baseboard management controller which are set on one board, wherein
   the baseboard management controller is configured to: in a standby state of the board, separately obtain system configuration information and a type of the processor, and if a processor type in the system configuration information is different from the type of the processor, update according to the type of the processor, a parameter that is relevant to the processor and is in the system configuration information, and change FLASH memory chip selection configuration in order to connect the processor to a FLASH memory for storing a BIOS program of the processor.

8. The apparatus according to claim 7, wherein
the processor is connected to each FLASH memory separately through a different pin; and
the baseboard management controller is connected to the processor through a system management bus, and changes the FLASH memory chip selection configuration by changing strap configuration of the processor in order to connect the processor to the FLASH memory for storing the BIOS program of the processor.

9. The apparatus according to claim 7, further comprises: a programmable logic device connected to the baseboard management controller and the processor separately, wherein
the processor is connected to each FLASH memory separately through a different pin; and
the baseboard management controller changes the FLASH memory chip selection configuration by performing a read/write operation on a register of the programmable logic device in order to connect the processor to the FLASH memory for storing the BIOS program of the processor.

10. The apparatus according to claim 7, further comprising: a FLASH selector connected to the baseboard management controller, the processor, and each FLASH memory separately, wherein
the baseboard management controller changes the FLASH memory chip selection configuration by controlling the FLASH selector in order to connect the processor to the FLASH memory for storing the BIOS program of the processor.

11. The apparatus according to claim 7, further comprises: a programmable logic device connected to the baseboard management controller, and a FLASH selector connected to the programmable logic device, the processor and each FLASH memory separately, wherein
the baseboard management controller controls the FLASH selector by performing a read/write operation on a register of the programmable logic device, and the FLASH selector changes the FLASH memory chip selection configuration according to control of the baseboard management controller in order to connect the processor to the FLASH memory storing the BIOS program of the processor.

12. The apparatus according to claim 7, wherein
the baseboard management controller is further configured to power up the board after changing the FLASH memory chip selection configuration, and to power up the board if the processor type in the configuration information is the same as the type of the processor.

* * * * *